Figure 1:
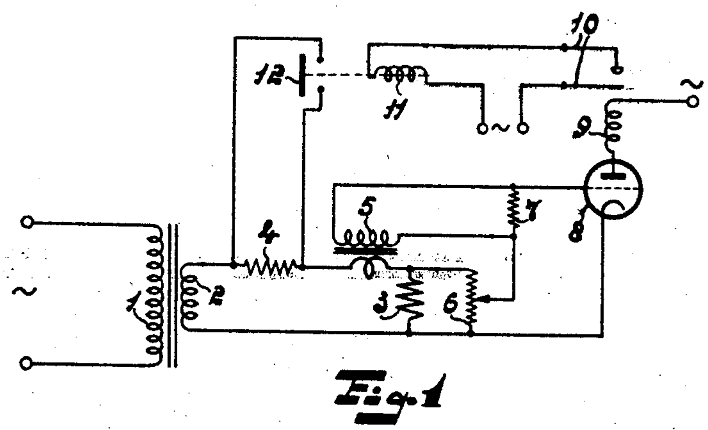

Oct. 1, 1957 A. H. VAN GORCUM 2,808,496

AUTOMATIC TEMPERATURE REGULATING SYSTEM

Filed Nov. 3, 1954

INVENTOR
ADRIAAN HENDRIK VAN GORCUM
BY Fred M. Vogel
AGENT

United States Patent Office 2,808,496

Patented Oct. 1, 1957

1

2,808,496

AUTOMATIC TEMPERATURE REGULATING SYSTEM

Adriaan Hendrik van Gorcum, Eindhoven, Netherlands, assignor, by mesne assignments, to North American Philips Company, Inc., New York, N. Y., a corporation of Delaware Application November 3, 1954, Serial No. 466,561

Claims priority, application Netherlands November 9, 1953

6 Claims. (Cl. 219—20)

The present invention concerns automatic temperature regulating systems of the type adaptable for use with electric ovens heated by means of a resistive element. The resistive heating elements are usually made from refractory metal such as, for example, molybdenum or tungsten. In systems of this type regulation results from varying the current flowing through the heating element in such manner as to reduce the current at excessive oven temperatures and increase the current if the temperature is too low. The regulation may be effected by means of a control resistor which is connected in series with the heating resistor of the oven by an automatic regulating relay, if the oven temperature is too high. Upon the temperature dropping below the desired value, the control resistor is short-circuited by the regulating relay, the current constantly fluctuating between two values. In an alternative system, the regulation may be continuous, as by variation of an inductance or by continuous variation of a series resistor. In another alternative system, the supply voltage may be varied in a direct manner by providing the secondary winding of the supply transformer with a number of tapping points. In these systems the regulating member may be a motor displacing a sliding contact, instead of a relay.

The automatic regulating member is controlled by an electric factor which varies with the oven temperature. This may be effected by means of a thermo-electric couple or by a resistance thermometer which comprises a resistor having a high positive or negative temperature coefficient of resistance. In such a system a Wheatstone bridge may be used, one of the arms of which comprises a resistor having a high temperature coefficient of resistance; the resistor being positioned in or near the oven. The output voltage of the bridge circuit is used to control the regulating member, the setting usually being such that the bridge is in equilibrium if the oven has the desired temperature.

Since it is often difficult to position the regulating member in the oven and said member operates comparatively slowly, it has been proposed to derive a voltage from the heating element itself, which voltage may serve to control the regulating member. If the heating element is a metal having a high temperature coefficient of resistance, the resistance of said element and consequently also the voltage across said element at a given current strength is a direct measure of its temperature. This temperature will often not considerably differ from the oven temperature of the oven to be regulated. The voltage on the heating element or part thereof may consequently serve to control the regulating member, the temperature of the heating element thus being maintained at a substantially constant value.

In the system of the present invention, an electric oven is heated by means of a heating element with a high temperature coefficient of resistance. The regulating member is controlled in accordance with the resistance value of said heating element, the said regulating member being controlled not only by a voltage derived directly from the voltage across the heating element but also by a voltage substantially proportional to the current flowing through said heating element. The latter voltage counteracts the former voltage.

The latter voltage is preferably taken from the secondary winding of a current transformer having its primary winding connected in series with the heating element to the A. C. supply voltage. The former voltage, or a constant part thereof, may be taken from the heating element by means of a potentiometer resistor connected in parallel with said heating element.

The difference voltage may be amplified by means of an amplifier comprising one or more controlled electron discharge tubes. The anodes of these tubes may be directly supplied with alternating current having a phase which is the same as that of the difference voltage. The setting may be such that, if the difference of the said voltages is zero, the relay acting as a regulating member is just deenergized or energized. In this case, regulation is preferably effected by means of a series-connected control resistor through which the heating element is supplied and which is cut in or out by the relay. The regulation concerned is a so-called two-condition control, that is to say there are two different states of operation which alternate periodically, regulation of average amount of energy supplied being effected by regulating the ratio of the duration of two operating conditions.

In order that the approximate power required for a desired operating temperature of the oven may be adjusted, the power may be supplied through a transformer having a secondary winding comprising a number of tapping points. The control resistance for automatic temperature regulation may be divided between the primary circuit and secondary circuit of the supply transformer.

Figure 2:
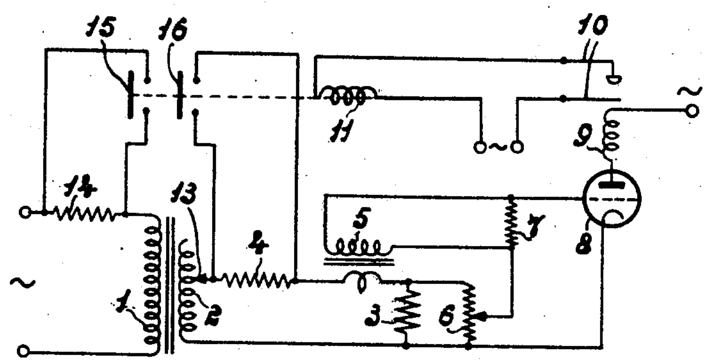

In order that the invention may be readily carried into effect it will now be described, by way of example, with reference to the accompanying drawing representing two embodiments thereof, wherein:

Fig. 1 is a schematic diagram of an embodiment of the automatic temperature regulating system of the present invention; and Fig. 2 is a schematic diagram of another embodiment of the automatic temperature regulating system of the present invention.

In Fig. 1, a primary winding 1 of a supply transformer is connected to a source of A. C. power. A secondary winding 2 of the supply transformer delivers, for example, a voltage of the order of 50 volts and supplies a resistive heating element 3 for the oven through a series-connected control resistor 4 and the primary winding of a current transformer 5. The heating element 3 is a highly refractory metal such as, for example, platinum, molybdenum or tungsten having a high temperature coefficient of resistance. The temperature coefficient of resistance of said metals is approximately 0.5% per degree centigrade. This property is utilized for the automatic regulation of the oven temperature.

Connected in parallel with the resistive heating element 3 is a potentiometer 6 from which a voltage is taken; said voltage, in series with the voltage through a resistor 7 from the secondary winding of the current transformer 5, is active in the input circuit of an electron discharge tube amplifier, represented as a triode 8. The output circuit of the amplifier comprises a relay coil 9. If the voltage in the input circuit of the amplifier is in phase with the anode voltage, a current tends to flow through the coil 9 by which the relay contact 10 is closed. This energizes a coil 11 of an electromagnetic switch 12, to close said switch and to short circuit the resistor 4. This operation occurs as planned when the temperature of the oven is too low. The current through and the voltage across the heating element 3 then increases abruptly and the oven temperature rises, with the result that the resistance of the heating element 3 also increases. The current through the heating element 3 subsequently decreases gradually and after some time, mainly determined by the thermal inertia of the oven, the regulating relay 9, 10 becomes deenergized. At a temperature slightly exceeding the desired oven temperature, the resistor 4 is again switched in and the oven temperature decreases and constantly fluctuates about the desired operating temperature. Upon a change of the conditions, for example, load variations of the oven, the temperature would be regulated to the same value, and then only the ratio between the duration of the period in which the resistor 4 is switched in and the duration of the period during which it is switched out will be slightly changed.

It has been found that the cutting in and out of the resistor 4 does not substantially affect the response of the regulating relay 9, 10; both the voltage on the potentiometer 6 and that on the resistor 7 change to the same degree. Since the said voltages counteract each other, the voltage in the input circuit of the amplifier will remain substantially zero.

The system reacts rapidly to supply voltage fluctuations. If the A. C. supply voltage increases, the resistance of the heating element 3 also increases rapidly due to heating, and the regulating relay becomes rapidly operative.

The desired operating temperature of the oven may be changed within certain limits by adjusting the sliding contact of the potentiometer 6. In order for the operating temperatures to be adjustable within wide limits, the secondary winding 2 of the supply transformer may be provided with a number of tapping points to permit the supply voltage to be varied. Such a circuit-arrangement is shown in Fig. 2.

Fig. 2 is a schematic diagram of another embodiment of the automatic temperature regulating system of the present invention. The circuit-arrangement shown in Fig. 2 is different from that shown in Fig. 1 in that a series-connected control resistor 4 is in the secondary side of the supply transformer and a series-connected control resistor 14 is in the primary side of the supply transformer. The control resistors 4 and 14 may be switched in or out by means of the switch arms 15 and 16 of an electromagnetic switch. By means of a movable contact 13 the point of the secondary transformer winding from which the supply voltage is taken may be selected as desired.

Division of the series-connected control resistor between the primary and the secondary circuit of the supply transformer is for the purpose of substantially equalizing any fluctuations in the supplied voltage which may occur during regulation, for any adjustment of the operating oven temperature. If, in effect, the control resistor were provided only in the primary circuit, the supply voltage variation, with the electromagnetic switch cut in or out, would be small at low oven temperatures, since then the contact 13 would be adjusted to a low point of the secondary winding 2, and the oven together with the supply transformer would constitute a load of comparatively high resistance, the addition of a resistance 14 altering the current but slightly.

At higher operating temperatures the variation of supply voltage would be much larger. If, contrary thereto, the control resistor were connected in series with the secondary winding, just the reverse would hold. By dividing the control resistor into suitable proportions between the primary circuit and the secondary circuit of the supply transformer, in accordance with the present invention, the supply power variation in switching is substantially constant in proportion to the total power, independently of the setting of the contact 13.

At an input voltage of from 30 to 50 volts and a primary A. C. supply voltage of 380 volts, the ratio between the primary series-connected control resistor and the secondary series-connected control resistor may be approximately 25.

The absolute values of the control resistors are chosen as low as possible in order to reduce the losses therein. Naturally, they should be made sufficiently high to permit the regulating means to cope with A. C. supply voltage fluctuations and overload fluctuations during operation.

While the invention has been described by means of specific examples and in specific embodiments, I do not wish to be limited thereto, for obvious modifications will occur to those skilled in the art without departing from the spirit and scope of the invention.

What is claimed is:

1. An automatic temperature regulating device comprising a resistive heating element exhibiting a high temperature coefficient of resistance, means for supplying energy to said resistive element, said energy supplying means comprising an alternating current source, regulating means coupled to said energy supplying means for controlling the supply of energy to said resistive element, impedance means interposed between said energy supplying means and said resistive element thereby to vary the voltage across said resistive element in accordance with variations of the resistance of said resistive element, means for deriving a first voltage having a value as determined by the said voltage across said resistive element, means for deriving a second voltage having a value as determined by the current flowing through said resistive element, said second voltage deriving means comprising a current transformer having a secondary winding and a primary winding connected in series with said resistive element, said second voltage being derived from said secondary winding, and means coupling said first and second voltage deriving means to said regulating means whereby said regulating means is controlled by said first and second voltages.

2. An automatic temperature regulating device comprising a resistive heating element exhibiting a high temperature coefficient of resistance, means for supplying energy to said resistive element, regulating means coupled to said energy supplying means for controlling the supply of energy to said resistive element, impedance means interposed between said energy supplying means and said resistive element thereby to vary the voltage across said resistive element in accordance with variations of the resistance of said resistive element, means for deriving a first voltage having a value as determined by the said voltage across said resistive element, means for deriving a second voltage having a value as determined by the current flowing through said resistive element, and means coupling said first and second voltage deriving means to said regulating means whereby said regulating means is controlled by said first and second voltages, said first voltage deriving means being connected in said coupling means to counteract said second voltage, said coupling means comprising an amplifier system having at least one discharge tube and input and output circuits, said first and second voltages being applied to said input circuit and said output circuit being coupled to said regulating means.

3. An automatic temperature regulating device comprising a resistive heating element exhibiting a high temperature coefficient of resistance, means for supplying energy to said resistive element, resistive means interposed between said energy supplying means and said resistive element thereby to vary the voltage across said resistive element in accordance with variations of the resistance of said resistive element, regulating means coupled to said energy supplying means for controlling the supply of energy to said resistive element, said regulating means comprising a relay adapted to selectively connect said resistive means in series with said resistive element, means for deriving a first voltage having a value as determined by the said voltage across said resistive element, means for deriving a second voltage having a value as determined by the current flowing through said resistive element, and means coupling said first and second voltage deriving means to said regulating means whereby said regulating means is controlled by said first and second voltages.

4. An automatic temperature regulating device comprising a resistive heating element exhibiting a high temperature coefficient of resistance, means for supplying energy to said resistive element, regulating means coupled to said energy supplying means for controlling the supply of energy to said resistive element, impedance means interposed between said energy supplying means and said resistive element thereby to vary the voltage across said resistive element in accordance with variations of the resistance of said resistive element, means for deriving a first voltage having a value as determined by the said voltage across said resistive element, said first voltage deriving means including a potentiometer connected in parallel with said resistive element, means for deriving a second voltage having a value as determined by the current flowing through said resistive element, and means coupling said first and second voltage deriving means to said regulating means whereby said regulating means is controlled by said first and second voltages.

5. An automatic temperature regulating device comprising a resistive heating element exhibiting a high temperature coefficient of resistance, means for supplying energy to said resistive element, said energy supplying means comprising a transformer having a secondary winding adapted to supply an adjustable voltage, regulating means coupled to said energy supplying means for controlling the supply of energy to said resistive element, impedance means interposed between said energy supplying means and said resistive element thereby to vary the voltage across said resistive element in accordance with variations of the resistance of said resistive element, means for deriving a first voltage having a value as determined by the said voltage across said resistive element, means for deriving a second voltage having a value as determined by the current flowing through said resistive element, and means coupling said first and second voltage deriving means to said regulating means whereby said regulating means is controlled by said first and second voltages.

6. An automatic temperature regulating device comprising a resistive heating element exhibiting a high temperature coefficient of resistance, means for supplying energy to said resistive element, said energy supplying means comprising a transformer having a primary winding and a secondary winding adapted to supply an adjustable voltage, a first resistor interposed between said energy supplying means and said resistive element thereby to vary the voltage across said resistive element in accordance with variations of the resistance of said resistive element, a second resistor, regulating means coupled to said energy supplying means for controlling the supply of energy to said resistive element, said regulating means being adapted to selectively connect said first resistor in series with said resistive element and said second resistor in series with said primary winding, means for deriving a first voltage having a value as determined by the said voltage across said resistive element, means for deriving a second voltage having a value as determined by the current flowing through said resistive element, and means coupling said first and second voltage deriving means to said regulating means whereby said regulating means is controlled by said first and second voltages.

References Cited in the file of this patent

UNITED STATES PATENTS

| | | |
|---|---|---|
| 2,455,379 | McLennan | Dec. 7, 1948 |
| 2,488,580 | Burleigh | Nov. 22, 1949 |
| 2,592,525 | Huck | Apr. 15, 1952 |
| 2,709,216 | Moran et al. | May 24, 1955 |